United States Patent [19]

Matsuda et al.

[11] 4,433,105

[45] Feb. 21, 1984

[54] CHLORINATED RUBBER AND POLYVINYL CHLORIDE COMPOSITION CONTAINING THE SAME

[75] Inventors: Akira Matsuda; Tetsuo Tojyo, both of Ichihara, Japan

[73] Assignee: Mitsui Petrochemical Industries, Ltd., Tokyo, Japan

[21] Appl. No.: 289,821

[22] Filed: Aug. 4, 1981

[30] Foreign Application Priority Data

Oct. 16, 1980 [JP] Japan ................... 55-145009

[51] Int. Cl.$^3$ ................................ C08F 8/20
[52] U.S. Cl. ................... 525/211; 525/332.1
[58] Field of Search ............... 525/211, 239, 332, 356, 525/357, 358

[56] References Cited

U.S. PATENT DOCUMENTS

| | | | |
|---|---|---|---|
| 2,996,473 | 8/1961 | Cain | 525/332 |
| 3,666,736 | 5/1972 | Hogan | 525/332 |
| 3,745,143 | 7/1973 | Baldwin | 525/332 |
| 3,896,095 | 7/1975 | Morrissey | 525/332 |
| 4,025,497 | 5/1977 | Natta | 525/332 |

*Primary Examiner*—Paul R. Michl
*Attorney, Agent, or Firm*—Armstrong, Nikaido, Marmelstein & Kubovcik

[57] ABSTRACT

A chlorinated rubber having a chlorine content of about 5 through about 50% by weight and a Mooney viscosity (ML$_{1+4}$ at 100° C.) of about 20 through about 150 is presented. This chlorinated rubber is derived from the chlorination of (i) a copolymer rubber of ethylene and 1-butene having a mol ratio of ethylene/1-butene of about 85/15 through about 95/5 or (ii) a copolymer rubber of ethylene 1-butene and 5-ethylidene-2-norbornene having a mol ratio of ethylene/1-butene of about 85/15 through about 95/5 and a content of the 5-ethylidene-2-norbornene of 20% by weight or less based on the weight of the copolymer. The incorporation of the chlorinated rubber into a polyvinyl chloride composition results in the remarkable improvement of the impact resistance and flexibility, both at a low temperature, of the polyvinyl chloride.

12 Claims, No Drawings

CHLORINATED RUBBER AND POLYVINYL CHLORIDE COMPOSITION CONTAINING THE SAME

BACKGROUND OF THE INVENTION

1. Field of the Invention

The present invention relates to a chlorinated rubber and, more specifically, it relates to a chlorinated rubber derived from the chlorination of a copolymer rubber of ethylene and 1-butene (i.e. an ethylene-1-butene copolymer rubber) or a copolymer (or terpolymer) rubber of ethylene, 1-butene and 5-ethylidene-2-norbornene (i.e. an ethylene-1-butene-5-ethylidene-2-norbornene copolymer (or terpolymer) rubber). The present invention also relates to a polyvinyl chloride composition containing the above-mentioned chlorinated rubber in which the impact resistance and flexibility, both at a low temperature, of the polyvinyl chloride are remarkably improved.

2. Description of the Prior Art

Chlorinated rubbers derived from the chlorination of ethylene- -olefin copolymer rubbers or ethylene- -olefin-non-conjugated diene copolymer (or terpolymer) rubbers are known in the art as disclosed in, for example, Japanese Patent Publication Nos. 41-911/66 and 46-4829/71. In these prior arts, solely propylene is used as an -olefin component of the ethylene- -olefin copolymer rubbers and, in the case of the terpolymers, dicyclopentadiene is mainly used as a non-conjugated diene component of the ethylene-α-olefin-non-conjugated diene copolymer rubbers. The chlorinated products of these copolymers have good and useful properties as disclosed in the above-mentioned patent publications.

However, these known chlorinated copolymers have disadvantages in that the strength characteristics are remarkably low in either unvulcanized or vulcanized state. Therefore, the field of application or use is naturally limited.

SUMMARY OF THE INVENTION

An object of the present invention is to obviate the above-mentioned disadvantages of the conventional chlorinated products of ethylene-α-olefin or ethylene-α-olefin-non-conjugated diene copolymers and to provide the chlorinated products of ethylene-α-olefin or ethylene-α-olefin-non-conjugated diene copolymers having good strength characteristics.

Another object of the present invention is to provide the chlorinated products of ethylene-α-olefin or ethylene-α-olefin-non-conjugated diene copolymers which can be used as a good modifier for polyvinyl chloride resins.

Other objects and advantages of the present invention will be apparent from the description set forth hereinbelow.

In accordance with the present invention, there is provided a chlorinated rubber having a chlorine content of 5 through 50% by weight and a Mooney viscosity $ML_{1+4}(100°\ C.)$ of about 20 through about 150, said chlorinated rubber being derived from the chlorination of (i) an ethylene-1-butene copolymer rubber having a mol ratio of ethylene/1-butene of about 85/15 through about 95/5 or (ii) an ethylene-1-butene-5-ethylidene-2-norbornene copolymer rubber having a mol ratio of ethylene/1-butene of about 85/15 through about 95/5 and a content of the 5-ethylidene-2-norbornene of 20% by weight or less based on the weight of the copolymer.

DETAILED DESCRIPTION OF THE INVENTION

The mol ratio of ethylene/1-butene of the copolymer rubber of ethylene-α-olefin or ethylene-α-olefin-5-ethylidene-2-norbornene to be chlorinated in the present invention should be about 85/15 through about 95/5, more preferably 87/13 through 94/6. The chlorinated products of the copolymers having the above-mentioned mol ratio range of ethylene/1-butene have excellent strength characteristics, either in the unvulcanized or vulcanized state, superior to those of the chlorinated products of bipolymers or terpolymers containing, as comonomer components, ethylene and propylene in the same mol ratio as the above-mentioned mol ratio of ethylene and 1-butene.

In the case where the 1-butene unit contained in the bipolymers or terpolymers is more than 15 mol% based on the total mol numbers of ethylene and 1-butene contained in the bipolymers or terpolymers, the strength of the chlorinated products thereof either in the unvulcanized or vulcanized state is unpreferably low, as the strength of the chlorinated products of bipolymers or terpolymers containing ethylene and 1-butene. Contrary to this, in the case where the content of the ethylene unit is more than about 95 mol%, the elastomeric properties of the chlorinated rubbers become poor either in the unvulcanized or vulcanized state.

In the case were dicyclopentadiene, which is conventionally used in the production of ethylene-α-olefin-non-conjugated diene, is used as a non-conjugated diene comonomer component instead of 5-ethylidene-2-norbornene, the chlorinated product of the resultant ethylene-1-butene-non-conjugated diene terpolymer is not suitable for use in many applications of the chlorinated rubber according to the present invention due to the fact that a lot of gel is contained in the chlorinated product.

Contrary to this, 5-ethylidene-2-norbornene used in the present invention is a preferred non-conjugated diene from the point of view of the small amount of the formed gel in the chlorinated product. The content of the 5-ethylidene-2-norbornene in the ethylene-1-butene-5-ethylidene-2-norbornene coplymer should be 20% by weight or less, preferably 2 through 19% by weight, and more preferably 3 through 10% by weight, based on the total weight of the non-chlorinated copolymers, in the case where the ethylene-1-butene-5-ethylidene-2-norbornene copolymer is vulcanized after chlorination. The use of the 5-ethylidene-2-norbornene of more than 20% by weight in the copolymer is not economical because the cost of the diene component is high. 2 through 19% by weight of the 5-ethylidene-2-norbornene in the copolymer substantially corresponds to an iodine value of about 5 through about 40.

The Mooney viscosity $ML_{1+4}$ (100° C.) of the ethylene-1-butene copolymer or ethylene-1-butene-5-ethylidene-2-norbornene copolymer, which is used as a starting material of the chlorinated rubber according to the present invention, is preferably about 5 through about 100, more preferably about 10 through about 80. In the case where the Mooney viscosity of the copolymer is below 5, the strength of the chlorinated rubber is undesirably decreased. Contrary to this, in the case where the Mooney viscosity of the copolymer is above 100, the melt flow characteristics of the chlorinated rubber is undesirably decreased, whereby the molding characteristics and the processing characteristics become worse and the uniform blending of the chlorinated rubber with the other rubbers and resins is impaired.

The density of the starting ethylene-1-butene copolymer or ethylene-1-butene-5-ethylidene-2-norbornene copolymer is preferably about 0.880 thorugh about 0.915 and the ratio of the weight-average molecular weight to the number-average molecular weight (i.e. Mw/Mn) of the starting copolymer is preferably less than 3.

The chlorination of the starting ethylene-1-butene copolymer or ethylene-1-butene-5-ethylidene-2-norbornene copolymer can be carried out in various manners. For instance: after the starting copolymer is crushed or ground, the resultant fine particles are contacted with molecular chlorine in an aqueous suspended state at a temperature of about 70 through about 90° C.; after the starting copolymer is dissolved in a solvent which is stable against chlorine, such as, carbon tetrachloride, tetrachloroethylene and the like, the resultant homogeneous solution is contacted with molecular chlorine; or, after chlorine-containing compounds such as N-chloroacetamide, N-chlorosuccinimide, 1,3-dichloro-5,5-dimethylhydantoin and the like are uniformly blended into the copolymer rubber by using milling rolls or a Banbury mixer, the compounded rubber is heated to such a temperature that chlorine is released from the chlorine-containing compounds. The most preferable method is chlorination in the aqueous suspended state. This is because, since the mol ratio of ethylene/1-butene in the starting bi-or ter-polymer of the present invention is within the range of about 85/15 through about 95/5 and also since the crystallization index of the copolymer rubber is 25 or more, preferably 30 through 70, the starting copolymer can be ground to fine particles at an ordinarily ambient temperature by a mechanical grinding. The term "crystallization Index" used herein is defined as a relative value of endothermic area of the copolymer rubber in a differential thermal analysis at a temperature range of 20° through 120° C. when the endothermic area of MIRASON ® M-9 (a low density polyethylene available from MITSUI POLY CHEMICALS Co., Ltd. having a melt index (190° C.), according to a ASTM-D-1238 method, of 1.5 and a density, according to a ASTM-D-1505 method, of 0.921) in a differential thermal analysis at a temperature range of 20° through 120° C. is assumed as 100.

The fine particles of the copolymer used in the chlorination under the aqueous suspended state is preferably in such a size that the particles pass through an open size of a 10 mesh (Tyler No.) screen. The use of the fine particles of the copolymer rubber having a size larger than the above-mentioned size is not desirable from the practical point of view. This is because the time sufficient to effect the desired chlorination becomes long and a uniform chlorination is difficult and further gellation occurs.

In the practice of the chlorination of the copolymer under the aqueous suspended state, the use of a surface active agent is recommended because the chlorination reaction system becomes stable.

The extent of the chlorination of the copolymer can be controlled by appropriately selecting the amount of the chlorination agent such as molecular chlorine used in the chlorination, the reaction time, the reaction temperature and the like. For instance, the chlorination of the copolymer may be carried out under the conditions of a reaction temperature of 60 through 100° C., a reaction time of 10 mins. through 3 hours and a feed rate of the molecular chlorine of 0.5 through 10.0 g/min. based on 100 g of the starting copolymer. In the case where molecular chlorine is used in the chlorination, the irradiation of light remarkably increases the chlorination reaction rate as is known in the conventional chlorination reaction (Yuki Gousei Kagaku Kyoukaishi, 29, 416, 1971).

After the chlorination, the chlorinated products can be treated as follows. For instance, in the case where the chlorination is effected in an aqueous suspended state, the chlorinated rubber is washed with water to remove the molecular chlorine from the chlorinated rubber and, then, dried. In the case where the chlorination is effected in a solution state, the reaction product is added to an excess amount of a poor solvent to the chlorinated rubber, such as methanol. The resultant precipitates are filtered, washed with the poor solvent and, then, dried.

The chlorinated rubber obtained as mentioned above should have a chlorine content of about 5 through about 50% by weight, preferably about 5 through about 35% by weight, based on the weight of the polymer and also should have a Mooney viscosity ($ML_{1+4}$ at 100° C.) of about 20 through about 150, preferably about 30 through about 80. In the case where the chlorine content and the Mooney viscosity are larger than the upper limits of the above-mentioned ranges, the melt flow characteristics are decreased, the mold ability and processability of the chlorinated rubber become worse and the uniform blending thereof with the other rubbers or resins is imparied. Contrary to this, in the case where the chlorine content of the chlorinated rubber is less than the lower limit of the above-mentioned range, the desired chlorination effect cannot be fully effected. That is, when the chlorinated rubber is used in the state of vulcanized rubber, the oil resistance, the adhesion property and the flame resistance are poor, and further, when the chlorinated rubber is blended with polyvinyl chloride, the improvement in the impact strength of the resultant composition is not sufficient. In the case where the Mooney viscosity is less than the lower limit of above-mentioned range, the strengths of the chlorinated rubber are undesirably decreased. The density of the chlorinated rubber of the present invention is preferably within the range of from about 0.950 to about 1.200.

The chlorinated rubber of the present invention has, in addition to various excellent properties such as weathering resistance, ozone resistance, oil resistance, fire retardancy, adhesive properties and the like as in the conventional halogenated products of ethylene-propylene rubbers or ethylene-propylene-non-conjugated diene copolymers, remarkably excellent strength characteristics even in a unvulcanized state. Therefore, the chlorinated rubber of the present invention can be used in a unvulcanized state, as a plasticizing rubber, in the fields of interior and exterior trim parts of automobiles, industrial parts such as packings, linings, belts, hoses, protective coatings and the like, insulating and covering materials such as lead-in wires, electric wire and the like, cover rubbers for gaskets, building components such as floor tiles, rubber coated fabrics and the like. The chlorinated rubber of the present invention can be molded by using any conventional molding machine for thermoplastic resins.

Furthermore, since the unvulcanized chlorinated rubbers of the present invention have a high flexibility and an excellent melt flow characteristics, the unvulcanized chlorinated rubbers can be readily blended with various resins. For instance, the unvulcanized chlorinated rubbers can be effectively used as an impact modifier for polyvinyl chloride, polystyrene, polypropyrene and the like, a non-migration type plasticizer for semirigid or non-rigid polyvinyl chloride, a fire retardant for polyolefins such as polyethylene, polypropylene and the like. Especially, the chlorinated rubbers of the present invention in an unvulcanized state are effective as an impact modifier for polyvinyl chloride and a non-migration type plasticizer for semirigid or non-rigid polyvinyl chloride.

As is well-known, polyvinyl chloride is one of the typical plastics and is molded and used in the various fields of applications in the form of, for example, films, sheets, pipes, leather-like materials, paper coated products, extruded products, molded products and fibers. However, polyvinyl chloride has disadvantages in that the plasticity is not sufficient and the cold temperature properties such as impact resistance are poor. For these reasons, various kinds of plasticizers or modifiers are in general compounded into polyvinyl chloride. Typical known modifiers for polyvinyl chloride are phthalic esters such as DOP (i.e. dioctyl phthalate), DBP (i.e. dibutyl phthalate) and the like and phosphoric esters such as TCP (i.e. tricresyl phosphate) and the like. However, since these liquid plasticizers have disadvantages in that migration and exudation occur and the loss of weight is caused due to heating, the blending of polymers such as nitrile rubber and chlorinated polyethylene as a plasticizer to polyvinyl chloride is practiced. Although the plasticity of the polyvinyl chloride blended with nitrile rubber or chlorinated polyethylene is improved, the improvement in the impact strength and the flexibility both at a low temperature are not sufficient.

We found that, in the case where the chlorinated rubber of the present invention is incorporated into polyvinyl chloride, not only the plasticity of the polyvinyl chloride is remarkably improved, but also the impact strength and flexibility at a low temperature are remarkably improved, as compared with the case in which nitrile rubber or chlorinated rubber is used.

The blending of the chlorinated rubber of the present invention can be effected in any conventional manner which has been heretofore used in the blending of polyvinyl chloride with nitrile rubber or chlorinated polyethylene.

The chlorinated rubber of the present invention can be readily ground or granulated into fine particles. Especially, in the case where the chlorinated rubber is granulated to fine particles having a size such that the particles pass through a screen having an opening size of 10 meshes or more, preferably 10 through 100 meshes (Tyler No.), no blocking occurs under loading conditions during storage and excellent storage stability can be obtained, as compared with the use of the conventional chlorinated products of ethylene-propylene copolymer rubber and the conventional chlorinated products of ethylene-propylene-non-conjugated diene copolymer rubber. Thus, the blending thereof with polyvinyl chloride in an extruder and a Henschel mixer can be advantageously effected. The compounding ratio of the chlorinated rubber of the present invention is generally within the range of about 3 through about 200 parts by weight, preferably about 5 through about 100 parts by weight, based on 100 parts by weight of polyvinyl chloride, although it depends upon its applications (e.g. non-rigid or semirigid).

The chlorinated rubbers of the present invention have excellent strength characteristics also in a vulcanized state. The vulcanization can be effected, as in the case of conventional rubbers, by preparing and molding unvulcanized compounded rubber to a desired shape and, then, by heating the molded compounded rubber in the presence of a vulcanizing agent such as a sulfur compound or an organic peroxide or by irradiating the molded compounded rubber with an electron beam. Furthermore, in the case of the vulcanization of the ethylene-1-butene copolymer, organic peroxides should be used as a vulcanizing agent.

The sulfur compounds used, as a vulcanizing agent, in the present invention include, for example, sulfur, sulfur chloride, sulfur dichloride, morpholine disulfide, alkylphenol disulfide, tetramethylthiuram disulfide, selenium dimethyldithiocarbamate and the like. Especially, the use of sulfur is most preferable. These sulfur compounds can be used in an amount of about 0.1 through about 10 parts by weight, preferably about 0.5 through about 5 parts by weight, based on 100 parts by weight of the chlorinated rubber.

The organic peroxide compounds used, as a vulcanizing agent, in the present invention include, for example, dicumyl peroxide, 2,5-dimethyl-2,5-di(tert.-butyl peroxy) hexane, 2,5-dimethyl-2,5-di(benzoyl peroxy) hexane, 2,5-dimethyl-2,5-di(tert.-butyl peroxy) hexine-3, di-tert.-butyl peroxy-3,3,5-trimethylcyclohexane, tert.-butyl hydroperoxide and the like. Especially, the use of dicumyl peroxide, di-tert.-butyl peroxide or di-tert.-butyl peroxy-3,3,5-trimethylcyclohexane is preferable. These organic peroxide compounds can be used in an amount of about $3 \times 10^{-4}$ through about $5 \times 10^{-2}$ mol, preferably about $1 \times 10^{-3}$ through $3 \times 10^{-2}$ mol, based on 100 g of the chlorinated rubber.

In the case where the sulfur compounds are used, as a vulcanizing agent, the use of a vulcanizing accelerator together with the vulcanizing agent, is desirable. Examples of the vulcanizing accelerator are: thiazol type accelerators such as N-cyclohexyl-2-benzothiazol sulfenamide, N-oxydiethylene-2-benzothiazol sulfenamide, N,N-diisopropyl-2-benzothiazol sulfenamide, 2-mercapto benzothiazol, 2-(2,4-dinitrophenyl) mercapto benzothiazol, 2-(2,6-diethyl-4-morpholino thio) benzothiazol, dibenzothiazol disulfide and the like; guanidine type accelerators such as diphenyl guanidine, triphenyl guanidine, diorthotolyl guanidine, orthotolyl biguanide, diphenyl guanidine phthalate and the like; aldehyde-amine or aldehyde-ammonia type accelerators such as acetaldehyde-aniline reaction products, butylaldehyde-aniline condensation products, hexamethylenetetramine, acetaldehyde-ammonia and the like; imidazoline type accelerators such as 2-mercaptoimidazoline and the like; thiourea type accelerators such as thiocarbonilide, diethylthiourea, dibutylthiourea, trimethylthiourea, diorthotolylthiourea and the like; thiuram type accelerators such as tetramethylthiuram monosulfide, tetramethylthiuram disulfide, tetraethylthiuram disulfide, tetrabutylthiuram disulfide, pentamethylenethiuram tetrasulfide and the like; dithio-acid salt type accelerators such as zinc dimethyldithiocarbamate, zinc diethyldithiocarbamate, zinc di-n-butyldithiocarbamate, ethylphenyldithiocarbamate, zinc butylphenyldithiocarbamate, sodium dimethyldithiocarbamate, selenium dimethyldithiocarbamate, tellurium diethyldithiocarbamate and the like; xanthate type accelerators such as zinc dibutylxanthate and the like; and zinc oxide, magnesium oxide, litharge (PbO), zinc carbonate, stearic acid, zinc stearate and the like. These vulcanizing accelerators can be used in an amount of about 0.1 through about 20 parts by weight, preferably about 0.2 through about 10 parts by weight, based on 100 parts by weight of the chlorinated rubber.

In the case where the organic peroxides are used as a vulcanizing agent, the use of a vulcanizing auxiliary, together with the organic peroxide, is desirable. Examples of the vulcanizing auxiliaries are: sulfur; quinone dioxime type auxiliaries such as p-quinone dioxime; methacrylate type auxiliaries such as polyethyleneglycol dimethacrylate; allyl type auxiliaries such as diallyl phthalate, triallyl cyanurate; maleimide type auxiliaries; divinyl benzene; and the like. These vulcanizing auxiliaries can be used in an amount of about 0.5 through about 2 mol, preferably about 1 mol, based on 1 mol of the organic peroxide used.

In the case where the vulcanization is effected by the use of, not a vulcanizing agent, but an electron ray, the molded unvulcanized chlorinated rubber is irradiated by an electron having an energy of about 0.1 through 20 MeV, preferably about 0.3 through 10 MeV in such an amount that the absorbed dose becomes about 0.5 through about 35 M rad, preferably about 0.5 through about 10 M rad. In this case, the above-mentioned vulcanizing auxiliaries, which can be used together with the above-mentioned organic peroxide vulcanizing agent, can be used, for example in an amount of abut $1 \times 10^{-4}$ through about $1 \times 10^{-1}$ mol, preferably $1 \times 10^{-3}$ through $1 \times 10^{-2}$ mol, based on 100 g of the chlorinated rubber.

The compound rubbers to be vulcanized can be prepared as follows. For instance, the chlorinated rubber and fillers are fixed mixed or kneaded at a temperature of about 80° through about 170° C. for about 3 through about 10 minutes by using a mixer such as a Banbury mixer. Then, the vulcanizing agent and, optionally, the vulcanizing accelerators or the vulcanizing auxiliaries, are further added to the mixture and further mixed with one another by using milling rolls at a roll temperature of about 40° through about 80° C. for about 5 through about 30 minutes. The compounded rubber can be taken out of the milled rolls in the form of ribbon or sheet. Otherwise, the chlorinated rubber and compounding agents are directly fed to an extruder heated at a temperature of about 80° through about 100° C. for a residence time of about 0.5 through about 5 minutes, whereby the compounded rubber in the form of pellets can be obtained.

The compounded rubber thus prepared is molded to a desired shape by using an extruder, calender rolls, a press and the like and, simultaneously with the molding or subsequent to the molding, is heated to a temperature of about 150° through about 270° C. for about 1 through about 30 minutes. Otherwise, the molded compounded rubber is irradiated by an electron beam, whereby the vulcanization is effected.

The vulcanized products of the chlorinated rubbers of the present invention themselves can be used as electrical insulating materials, exterior trim parts of automobiles, roofings, hoses such as radiator hoses of automobiles. Examples of the electrical insulating materials are caps around the combustion engines of automobile such as plug caps, ignition caps, distributor caps and the like; condenser caps, insulating layers cylindrically covered on the electric discharge portions of electric wires such as marine electric wires, ignition cables for automobiles, cable joint covers and the like. Examples of the exterior trim parts of automobiles are bumpers, bumper fillers, bumper strips, bumper side guards, over-riders, sice protection moles and the like.

Furthermore, a foaming agent and, optionally a foaming auxiliary can be incorporated into the compounded rubber of the present invention prior to the vulcanization and the foamed vulcanized products, which can be used as a heat insulating material, a cushioning material, a sealing material, a soundproofing material, an electrical insulating material and the like.

Examples of foaming agents which can be used in the present invention are: inorganic foaming agents such as sodium carbonate, sodium bicarbonate, sodium carbonate ammonium bicarbonate, ammonium nitrite and the like; nitroso compounds such as N,N'-dimethyl-N,N'-dinitrosoterephthalamide, N,N'-dinitrosopentamethylene tetramine and the like; azo compounds such as azodicarbonamide, azobisisobutyronitrile, azocyclohexylnitrile, azodiaminobenzene, barium azodicarboxylate and the like; sulfonyl hydrazide compounds such as benzenesulfonyl hydrazide, toluenesulfonyl hydrazide, p,p'-oxy-bis (benzenesulfonyl hydrazide), diphenylsulfone-3,3'-disulfonyl hydrazide) and the like; azide compounds such as calcium azide, 4,4'-diphenyldisulfonyl azide, p-toluenesulfonyl azide and the like. Especially, nitroso compounds, azo compounds and azide compounds can be preferably used. These foaming agent can be used, for example, in an amount of about 0.5 through about 30 parts by weight, preferably about 1 through about 20 parts by weight, based on 100 parts by weight of the chlorinated rubber, whereby the foamed product having an apparent specific gravity of about 0.03 through about 0.7 can be formed.

The foaming auxiliaries which can be used together with the above-mentioned foaming agents include, for example, organic acids such as salicylic acid, phthalic acid, stearic and the like, or urea or its derivatives. The use of these foaming auxiliaries results in the decrease in the decomposition temperature of the foaming agents, the acceleration of the decomposition of the foaming agents and the uniformity of the formed foam.

The foaming can be effected in the same manner as in the case of conventional ethylene-propylene-non-conjugated diene copolymer rubbers. The specific strength ($T_B/D$) of the resultant foamed products ($T_B$=tensile stress at break, $kg/cm^2$; D=apparent specific gravity) can be 100 $kg/cm^2$ or more.

As mentioned hereinabove, the chlorinated rubbers of the present invention have advantages in that they can be readily processed by using any general rubber processing machine and also that they can be readily vulcanized by using any conventional vulcanizing agent for rubbers. Therefore, the chlorinated rubber of the present invention can be blended and vulcanized with, for example, ethylene-propylene copolymer rubbers, butyl rubbers, butadiene rubbers, isoprene rubbers, styrene-butadiene copolymer rubbers and the like. Thus, the fire retardancy, the oil resistance and the adhesive properties of the rubbers can be improved and the vulcanized products having excellent strength characteristics can be obtained.

EXAMPLES

The present invention is now illustrated by, but is by no means limited to, the following examples in which all parts and percentages are expressed on a weight basis unless otherwise specified.

EXAMPLES 1 THROUGH 5

An ethylene-1-butene-5-ethylidene-2-norbornene (ENB) copolymer rubber, having properties shown in Table 1 below, was mechanically ground at a room temperature by using a turbo-mill (manufactured by TURBO INDUSTRIES in Japan), whereby the copolymer particles which could pass through a screen having an opening size of 20 meshes (Tyler No.) were obtained. A mixture of 200 g of the copolymer particles obtained above, 0.1 g of Epan 750 (a nonionic emulsifier available from Daiich Kogyo Seiyaku in Japan) and 2 liters of water was charged to and heated in a glass vessel having an internal volume of 3 liters and provided with an agitator and a thermometer. After the temperature of the mixture became 80° C., a chlorine gas was introduced at a rate of 2.0 g/min. to the suspended mixture, while a 20 W day-light type fluorescent tube was irradiated from the outside of the vessel. Thus, the chlorination reaction was carried out at a temperature of 80° through 83° C. for the time listed in Table 1 below.

The reaction mixture was filtered and, then, subjected to a one-hour washing with 2 liter of warm water at a temperature of 60° C. three times. Thereafter, the washed product was further washed with cold water once and dried in vacuo at a temperature of 50° C. Thus, the chlorinated rubber having such a size that the particles thereof could pass through a screen having an opening size of 20 meshes (Tyler No.). The chlorine content of the resultant chlorinated rubber was determined according to a bomb combustion method. The results are shown in Table 1 below.

Furthermore, the gel fraction of the chlorinated rubber was determined as follows. To a screen basket made of a screen having an opening size of 100 meshes, about 0.2 g of the chlorinated rubber which was precisely weighed in a 0.1 mg unit was charged and was allowed to stand for 1 hour in 300 ml of boiled p-xylene. The resultant insoluble matter in the basket was dried in vacuo for 3 hours at a temperature of 50° C. After cooling the insoluble matter to a room temperature, the weight of the insoluble matter was precisely weighed in a 0.1 mg unit and the weight percentage of the insoluble matter to the total weight of the chlorinated rubber was defined as a gel fraction.

In order to determine the properties of the unvulcanized chlorinated rubber, the chlorinated rubber was preheated for 6 minutes in a hot press at a temperature of 150° C. and, then, was pressed for 4 minutes under a pressure of 100 kg/cm². Thus, a press sheet having a thickness of 2 mm was prepared and the stress at break and the elongation at break were determined according to a JIS (Japanese Industrial Standards)-K-6301 method.

On the other hand, in order to determine the properties of the vulcanized chlorinated rubber, a pressed sheet having a thickness of 2 mm was prepared from the compounded rubber having the following formulation.

| Ingredient | Parts |
| --- | --- |
| Chlorinated Rubber | 100 |
| Zinc Stearate | 5 |

| Ingredient | Parts |
| --- | --- |
| Light-Weight Magnesium Oxide | 10 |
| HAF Carbon Black | 20 |
| Mercapto Benzothiazol | 0.5 |
| Tetramethylenethiuram Disulfide | 2.0 |
| Sulfur | 1.0 |

The pressed sheet was prepared by kneading the compound rubber by using 8 inch rolls, followed by the vulcanization under pressing for 30 minutes at a temperature of 150° C.

The stress and elongation at break, the surface hardness, the oil resistance and the adhesion properties of the pressed sheet were determined according to a JIS-K-6301 method. The test of the oil resistance was effected by determining the swelling percentage of the vulcanized sheet dipped in JIS#1 oil at a temperature of 100° C. for 20 hours. The test of the adhesion properties was effected as follows. The surfaces of two sheets of the vulcanized sheets were wiped with toluene and air-dried. A chloroprene type adhesive (Bond G 17 available from KONISHI Inc.) was coated on the surfaces of the sheets to be adhered and the coated surfaces were contact bonded with each other and allowed to stand for 3 days at room temperature. The peel test was carried out at a peeling rate of 50 mm/min. Thus, the peel strength per 1 inch was determined. The results are shown in Table 1 below.

COMPARATIVE EXAMPLE 1

The various characteristics of the copolymer rubber of Examples 1 through 3, in an unvulcanized state, were determined in a manner as described above. The results are shown in Table 1 below.

EXAMPLE 6

50 g of the copolymer rubber used in Examples 1 through 3 was dissolved in 2 liters of carbon tetrachloride and the solution was charged into a glass vessel having an internal volume of 3 liters and provided with an agitator and a thermometer. A chlorine gas was introduced for 25 min. at a rate of 2.0 g/min to the reaction vessel, while the solution temperature was maintained at 80° C. and also while a 20 W day-light type fluorescent tube was irradiated from the outside of the vessel. After removing the excess chlorine gas from the vessel by passing a nitrogen gas through the reaction vessel, the reaction solution was added to a large excess amount of methanol, whereby the chlorinated rubber was precipitated. The precipitates were filtered, washed with methanol and dried in vacuo at a room temperature.

The chlorine content of the resultant chlorinated rubber was 20%, which was determined according to a bomb combustion method. The characteristics of the chlorinated rubber are shown in Table 1 below.

COMPARATIVE EXAMPLE 2

The chlorination of ethylene-propylene-5-ethylidene-2-norbornene copolymer rubber having the properties listed in Table 1 below was effected for 66 minutes in a manner as described in Examples 1 through 3.

The chlorine content of the chlorinated rubber thus obtained was 18%, which was determined according to a bomb combustion method. The characteristics of the chlorinated rubber are shown in Table 1 below.

COMPARATIVE EXAMPLE 3

The chlorination of ethylene-1-butene-5-ethylidene-2-norbornene copolymer rubber having the properties listed in Table 1 below was effected for 23 minutes in a manner as described in Example 6.

The chlorine content of the chlorinated rubber thus obtained was 19%, which was determined according to a bomb combustion method. The characteristics of the chlorinated rubber are shown in Table 1 below.

COMPARATIVE EXAMPLE 4

The chlorination of ethylene-1-butene-dicyclopentadiene (DCPD) copolymer rubber having the properties listed in Table 1 below was effected for 72 minutes in a manner as described in Example 1.

The chlorine content of the chlorinated rubber thus obtained was 19%, which was determined according to a bomb combustion method.

Since the chlorinated rubber was not able to be processed due to the formation of gel, the characteristics of the resultant chlorinated rubber could not be determined.

through a screen having an opening size of 20 meshes (Tyler No.).

The chlorine content of the chlorinated rubber was 21%, which was determined according to a bomb combustion method.

Since this chlorinated rubber cannot be vulcanized with sulfur, the characteristics of the unvulcanized chlorinated rubber were determined. The results are shown in Table 2 below.

EXAMPLE 8

The chlorination of ethylene-1-butene copolymer rubber having the properties listed in Table 2 below was effected for 146 minutes in a manner as described in Example 1.

The resultant chlorinated rubber had a particle size such that the particles could pass through a screen having an opening size of 20 meshes (Tyler No.).

The chlorine content of the chlorinated rubber was 31%, which was determined according to a bomb combustion method.

Since this chlorinated rubber cannot be vulcanized with sulfur, the characteristics of the unvulcanized

TABLE 1

|  | Example 1 | Example 2 | Example 3 | Example 4 | Example 5 | Comparative Example 1 | Example 6 | Comparative Example 2 | Comparative Example 3 | Comparative Example 4 |
|---|---|---|---|---|---|---|---|---|---|---|
| COPOLYMER RUBBER | | | | | | | | | | |
| α-Olefin | 1-Butene | 1-Butene | 1-Butene | 1-Butene | 1-Butene | 1-Butene | 1-Butene | Propylene | 1-Butene | 1-Butene |
| Ethylene/α-Olefin (mol ratio) | 92/8 | 92/8 | 92/8 | 88/12 | 95/5 | 92/8 | 92/8 | 92/8 | 70/30 | 92/8 |
| Non-Conjugated Diene | ENB | ENB | ENB | ENB | ENB | ENB | ENB | ENB | ENB | DCPD |
| Iodine Value | 10 | 10 | 10 | 10 | 10 | 10 | 10 | 11 | 9 | 10 |
| $ML_{1+4}$, 100° C. | 15 | 15 | 15 | 15 | 15 | 15 | 15 | 16 | 13 | 15 |
| CHLORINATION METHOD | Suspension | Suspension | Suspension | Suspension | Suspension | — | Solution | Suspension | Solution | Suspension |
| CHLORINATION REACTION TIME (min.) | 26 | 64 | 146 | 64 | 64 | — | 25 | 66 | 23 | 72 |
| CHLORINATED RUBBER | | | | | | | | | | |
| Chlorine Content (wt. %) | 10 | 19 | 30 | 18 | 22 | — | 20 | 18 | 19 | 20 |
| $ML_{1+4}$, 100° C. | 18 | 31 | 58 | 33 | 30 | 27 | 35 | 28 | 37 | >200 |
| Gel Fraction (%) | <1.0 | <1.0 | 1.8 | <1.0 | <1.0 | <1.0 | <1.0 | <1.0 | <1.0 | 83 |
| PROPERTIES OF UNVULCANIZED RUBBER | | | | | | | | | | |
| Tensile Strength (kg/cm$^2$) | 160 | 135 | 85 | 75 | 150 | 195 | 110 | 48 | 13 | Gelation |
| Elongation at Break (%) | 830 | 870 | 850 | 810 | 910 | 750 | 870 | 850 | 1010 | Gelation |
| PROPERTIES OF VULCANIZED RUBBER | | | | | | | | | | |
| Tensile Strength (kg/cm$^2$) | 249 | 222 | 201 | 180 | 260 | 283 | 210 | 98 | 76 | Gelation |
| Elongation at Break (%) | 610 | 690 | 780 | 650 | 770 | 540 | 690 | 650 | 810 | Gelation |
| Surface Hardness (JISA) | 86 | 80 | 73 | 68 | 81 | 93 | 78 | 85 | 61 | Gelation |
| Swelling Volume (%) | 64 | 31 | 8 | 28 | 29 | 95 | 28 | 35 | 30 | Gelation |
| ADHESION PROPERTY | | | | | | | | | | |
| PEEL STRENGTH (Kg/inch) | 5.1 | 6.8 | 11.9 | 7.1 | 6.9 | 3.2 | 7.1 | 6.8 | 6.9 | Gelation |

EXAMPLE 7

The chlorination of ethylene-1-butene copolymer rubber having the properties listed in Table 2 below and having a particle size such that the particles could pass through a screen having an opening size of 20 meshes (Tyler No.) was effected for 59 minutes in a manner as described in Example 1. The resultant chlorinated rubber had a particle size such that the particles could pass chlorinated rubber were determined. The results are shown in Table 2 below.

COMPARATIVE EXAMPLE 5

The chlorination of the freeze-ground ethylene-propylene copolymer rubber having the properties listed in Table 2 below and having a particle size such that the particles could pass through a screen having an opening size of 20 meshes (Tyler No.) was effected in the same manner as in Example 7.

The chlorine content of the chlorinated rubber thus obtained was 19%, which was determined according to a bomb combustion method. The characteristics of the unvulcanized chlorinated rubber were determined. The results are shown in Table 2 below.

Thus, pressed sheets having a thickness of 2 mm (and having a thickness of 1 mm for falling dart impact test) were obtained. The test results are shown in Table 3 below.

EXAMPLE 10

A polyvinyl chloride composition was prepared and press molded in a manner as described in Example 9,

TABLE 2

|  | Example 7 | Example 8 | Comparative Example 5 |
|---|---|---|---|
| COPOLYMER RUBBER |  |  |  |
| α-Olefin | 1-Butene | 1-Butene | Propylene |
| Ethylene/α-Olefin (Mol Ratio) | 92/8 | 95/5 | 92/8 |
| Non-Conjugated Diene | — | — | — |
| Iodine Value | — | — | — |
| $ML_{1+4}$, 100° C. | 16 | 40 | 20 |
| CHLORINATION METHOD | Suspension | Suspension | Suspension |
| CHLORINATION REACTION TIME (min.) | 59 | 146 | 59 |
| CHLORINATED RUBBER |  |  |  |
| Chlorine Content (wt. %) | 21 | 31 | 19 |
| $ML_{1+4}$, 100° C. | 30 | 72 | 36 |
| Gel Fraction (%) | <1.0 | <1.0 | <1.0 |
| PROPERTIES OF UNVULCANIZED RUBBER |  |  |  |
| Tensile Strength (kg/cm$^2$) | 140 | 115 | 45 |
| Elongation at Break (%) | 850 | 820 | 790 |

EXAMPLE 9

A mixture of 10 parts of the chlorinated rubber in the form of powder obtained in Example 2 above having a size such that the powder particles could pass through a screen having an opening size of 20 meshes (Tyler No.), 100 parts of polyvinyl chloride (ZEON 103 EP available from NIPPON ZEON Co., Ltd. in Japan), 1.5 parts of an organic Cd-Ba-Zn type stabilizer for polyvinyl chloride (LKBZ-80 available from Sakai Chemicals in Japan), 0.5 parts of a Cd-Zn type stabilizer (LCZ-10 available from Sakai Chemicals in Japan) and 1.0 part of calcium stearate (available from Wako Junyaku in Japan) was mixed at a temperature of 50° C. in a Henschel mixer. The mixture was then kneaded for 5 minutes by using 8 inch rolls having a surface temperature of 130° through 140° C. The kneaded mixture was pressed as follows:

The kneaded mixture was, first, preheated at a temperature of 170° C. for 3 minutes and, then, hot pressed under a pressure of 100 kg/cm$^2$ at a temperature of 170° C. for 2 minutes and, finally, cold pressed under a pressure of 100 kg/cm$^2$ at a temperature of 20° C. for 5 minutes.

except that the chlorinated ethylene-1-butene copolymer obtained in Example 7 was used, in lieu of the chlorinated ethylene-1-butene-5-ethylidene-2-norbornene copolymer rubber obtained in Example 2.

The test results are shown in Table 3 below.

COMPARATIVE EXAMPLE 6

A polyvinyl chloride composition was prepared and press molded in a manner as described in Example 9, except that unmodified ethylene-1-butene copolymer (prior to the chlorination) obtained in Example 7 was used, in lieu of the chlorinated rubber obtained in Example 2.

The test results are shown in Table 3 below.

COMPARATIVE EXAMPLE 7

A polyvinyl chloride composition was prepared and press molded in a manner as described in Example 9, except that chlorinated polyethylene (ELASLEN 301A, available from SHOWA DENKO Co., Ltd. in Japan) was used, in lieu of the chlorinated rubber obtained in Example 2.

The test results are shown in Table 3 below.

TABLE 3

| COMPOUNDED MODIFIER | | Example 9 Chlorinated Ethylene-1-Butene-ENB Copolymer Rubber | Example 10 Chlorinated Ethylene-1-Butene Copolymer Rubber | Comparative Example 6 Ethylene-1-Butene Copolymer Rubber | Comparative Example 7 Chlorinated Polyethylene |
|---|---|---|---|---|---|
| PROPERTIES OF POLYVINYL CHLORIDE COMPOSITION | | | | | |
| Bending Modulus*$^1$ (kgf/cm$^2$) | | 23.0 × 10$^3$ | 23.5 × 10$^3$ | 20.3 × 10$^3$ | 24.0 × 10$^3$ |
| Izod Impact Strength*$^2$ (kg cm/cm) | Initial | 98 | 100 | 8 | 40 |
| | 500 hr Irradiation (Sunshine Weather-O-Meter) | 96 | 98 | 7 | 38 |
| Falling Dart Impact Strength | | 6.7 | 6.2 | 1.5 | 4.1 |

TABLE 3-continued

| COMPOUNDED MODIFIER | Example 9 Chlorinated Ethylene-1-Butene-ENB Copolymer Rubber | Example 10 Chlorinated Ethylene-1-Butene Copolymer Rubber | Comparative Example 6 Ethylene-1-Butene Copolymer Rubber | Comparative Example 7 Chlorinated Polyethylene |
|---|---|---|---|---|
| Test (kg.m/1 mm sheet) | | | | |

*[1] JIS-K-6740 method
*[2] JIS-K-6740 method
*[3] various weights, the diameter of the top portion of which is 24 mm, were dropped from the height of 1 m on the pressed sheet having a size of 130 mm wide × 1 mm thick and the weight (Kg) by which 50% of the test sheet was fractured was defined as drop-weight impact strength.

EXAMPLE 11

A mixture of 100 parts of the chlorinated rubber in the form of powder obtained in Example 7 above having a size such that the powder particles could pass through a screen having an opening size of 20 meshes (Tyler No.), 100 parts of polyvinyl chloride (Zeon 103 EP available from NIPPON ZEON Co., Ltd. in Japan), 1.5 parts of an organic Cd-Ba-Zn type stabilizer for polyvinyl chloride (LKBZ-80 available from Sakai Chemicals in Japan), 0.5 parts of a Cd-Zn type stabilizer (LCZ-10 available from Sakai Chemicals in Japan) and 1.0 part of calcium stearate (available from Wako Junyaku in Japan) was mixed at a temperature of 50° C. in a Henschel mixer. The mixture was then kneaded for 5 minutes by using 8 inch rolls having a surface temperature of 130° through 140° C. The kneaded mixture was pressed as follows:

The kneaded mixture was, first preheated at a temperature of 170° C. for 3 minutes and, then, hot pressed under a pressure of 100 kg/cm² at a temperature of 170° C. for 2 minutes and, finally, cold pressed under a pressure of 100 kg/cm² at a temperature of 20° C. for 5 minutes.

Thus, pressed sheets were obtained as test samples. The test results are shown in Table 4 below.

COMPARATIVE EXAMPLE 8

A semirigid polyvinyl chloride composition was prepared and press molded in a manner as described in Example 11, except that the chlorinated polyethylene (MR 104 available from Osaka Soda in Japan) was used, in lieu of the chlorinated rubber obtained in Example 7.

The test results are shown in Table 4 below.

COMPARATIVE EXAMPLE 9

A semirigid polyvinyl chloride composition was prepared and press molded in a manner as described in Example 11, except that 40 parts of diocyl phthalate (available from Wako Junyaku in Japan) was used, in lieu of 100 parts of the chlorinated rubber obtained in Example 7.

The test results are shown in Table 4.

EXAMPLE 12

The storage stabilities of the chlorinated rubbers, in the form of powdered particles, obtained in Examples 2, 4 and 7 above as well as the known chlorinated ethylene-propylene rubber (TAFMER® P-0680 available from MITSUI PETROCHEMICAL INDUSTRIES, Ltd.) and the chlorinated product of the commercially available ethylene-propylene-diene (END) rubber (Ep 51X available from NIPPON EP RUBBER), both in the form of powdered particles were tested. The test was carried out in a manner that 5 bags each containing 25 kg of the powdered rubber having a size such that the particles could pass through a screen having an opening size of 20 meshes (Tyler No.) were piled up and allowed to stand for one month at an ambient temperature of 40° C. After one month, the blocking conditions of the powdered particles of the rubbers in the bags were visually observed.

The results are shown in Table 5 below.

TABLE 4

| COMPOUNDED MODIFIER | Example 11 Chlorinated Ethylene-1-Butene Copolymer Rubber | Comparative Example 8 Chlorinated Polyethylene | Comparative Example 9 Dioctyl Phthalate |
|---|---|---|---|
| GENERAL PROPERTIES*[1] | | | |
| TB (kg/cm²) | 110 | 93 | 220 |
| EB (%) | 210 | 200 | 290 |
| HS (JIS A) | 82 | 86 | 84 |
| TEMPERATURE DEPENDENCY OF MODULUS IN TORSION G0° C./G25° C. | 1.5 | 2.1 | 7.8 |

*[1] JIS-K-6723
*[2] The modulus in torsion was determined by using a Clash-Berg torsional tester according to a ASTM-D-1043 method.

TABLE 5

| Example No. | 2 | 4 | 7 | Comparative | Comparative |
|---|---|---|---|---|---|
| COPOLYMER RUBBER | | | | | |
| α-Olefin | 1-Butene | 1-Butene | 1-Butene | Propylene | Propylene |
| Ethylene/α-Olefin (mol ratio) | 92/8 | 88/12 | 92/8 | 82/18 | 81/19 |
| Non-Conjugated Diene | ENB | ENB | — | ENB | — |
| Iodine Value | 10 | 10 | — | 16 | — |
| ML$_{1+4}$, 100° C. | 15 | 15 | 16 | 35 | 60 |
| Crystallization Index | 51 | 30 | 54 | 20 | 18 |
| CHLORINATION METHOD | Suspension | Suspension | Suspension | Suspension | Suspension |
| CHLORINATED RUBBER | | | | | |

TABLE 5-continued

| Example No. | 2 | 4 | 7 | Comparative | Comparative |
|---|---|---|---|---|---|
| Chlorine Content (%) | 19 | 18 | 21 | 20 | 20 |
| Particle Diameter | 20 mesh pass | 20 mesh pass | 20 mesh pass | 20 mesh pass | 20 mesh pass |
| BLOCKING PROPERTY OF CHLORINATED RUBBER | No Blocking | No Blocking | No Blocking | Blocking | Blocking |

We claim:

1. A chlorinated rubber having a chlorine content of 10 through 50% by weight of a Mooney viscosity ($ML_{1+4}$ at 100° C.) of about 20 through about 150, said chlorinated rubber being derived from the chlorination of (i) a copolymer rubber of ethylene and 1-butene having a mol ratio of ethylene/1-butene of 87/13 through 95/5 or (ii) a copolymer rubber of ethylene, 1-butene and 5-ethylidene-2-norboronese having a mol ratio of ethylene/1-butene of 87/13 through 95/5 and a content of the 5-ethylidene-2-norbornene of 20% by weight or less based on the weight of the copolymer.

2. A chlorinated rubber as claimed in claim 1, wherein the density of the chlorinated rubber is 0.950 through 1.200.

3. A chlorinated rubber as claimed in claim 1, wherein the chlorine content of the chlorinated rubber is 10 through 35% by weight.

4. A chlorinated rubber as claimed in claim 1, wherein the particle size of the chlorinated rubber is such that the particles pass through a screen having an opening size of a 10 mesh (Tyler No.).

5. A chlorinated rubber as claimed in claim 1, wherein the content of the 5-ethylidene-2-norbornene in the copolymer rubber (ii) prior to the chlorination is 2 through 20% by weight based on the weight of the copolymer.

6. A chlorinated rubber as claimed in claim 1, wherein the ratio of the weight average molecular weight to the number average molecular weight ($\overline{Mw}/\overline{Mn}$) of the starting copolymer of ethylene and 1-butene or ethylene, 1-butene and 5-ethylidene-2-norbornene is less than 3.

7. A polyvinyl chloride composition comprising 100 parts by weight of polyvinyl chloride and 3 through 200 parts by weight of at least one chlorinated rubber having a chlorine content of 5 through 50% by weight and a Mooney viscosity ($ML_{1+4}$ at 100° C.) of about 20 through about 150, said chlorinated rubber being derived from the chlorination of (i) a copolymer rubber of ethylene and 1-butene having a mol ratio of ethylene/1-butene of about 85/15 through about 95/5 or (ii) a copolymer rubber of ethylene, 1-butene and 5-ethylidene-2-norbornene having a mol ratio of ethylene/1-butene of about 85/15 through about 95/5 and a content of the 5-ethylidene-2-norbornene of 20% by weight or less based on the weight of the copolymer.

8. A polyvinyl chloride composition as claimed in claim 7, wherein the density of the chlorinated rubber is 0.950 through 1.200.

9. A polyvinyl chloride composition as claimed in claim 7, wherein the chlorine content of the chlorinated rubber is 5 through 35% by weight.

10. A polyvinyl chloride composition as claimed in claim 7, wherein the particle size of the chlorinated rubber is such that the particles pass through a screen having an opening size of a 10 mesh (Tyler No.).

11. A polyvinyl chloride composition as claimed in claim 7, wherein the content of the 5-ethylidene-2-norbornene in the copolymer rubber (ii) prior to the chlorination is 2 through 20% by weight based on the weight of the copolymer.

12. A polyvinyl chloride composition as claimed in claim 7, wherein the content of said chlorinated rubber is about 5 through about 100 parts by weight based on 100 parts by weight of polyvinyl chloride.

* * * * *